(12) United States Patent
Breton et al.

(10) Patent No.: US 11,506,751 B2
(45) Date of Patent: Nov. 22, 2022

(54) METHOD AND SYSTEM FOR DETECTION BY LONG INTEGRATION OF KINETICALLY GROUPED RECURRING SAMPLES

(71) Applicant: THALES, Courbevoie (FR)

(72) Inventors: Pierre-Albert Breton, Merignac (FR); Vincent Corretja, Merignac (FR); Richard Montigny, Merignac (FR); Stéphane Kemkemian, Elancourt (FR)

(73) Assignee: THALES, Courbevoie (FR)

( * ) Notice: Subject to any disclaimer, the term of this patent is extended or adjusted under 35 U.S.C. 154(b) by 358 days.

(21) Appl. No.: 16/692,970

(22) Filed: Nov. 22, 2019

(65) Prior Publication Data

US 2020/0166605 A1 May 28, 2020

(30) Foreign Application Priority Data

Nov. 23, 2018 (FR) ........................................ 1871763

(51) Int. Cl.
*G01S 7/292* (2006.01)
*G01S 13/91* (2006.01)
(Continued)

(52) U.S. Cl.
CPC .......... *G01S 7/2926* (2013.01); *G01S 7/2923* (2013.01); *G01S 13/56* (2013.01); *G01S 13/72* (2013.01); *G01S 13/917* (2019.05)

(58) Field of Classification Search
CPC ...... G01S 7/2926; G01S 7/2923; G01S 13/56; G01S 13/72; G01S 13/917; G01S 13/426; G01S 13/50; G01S 13/726
See application file for complete search history.

(56) References Cited

U.S. PATENT DOCUMENTS 9,513,366 B2 12/2016 Quellec et al.
10,627,507 B1 * 4/2020 Parker .................... H01Q 25/00
(Continued)

FOREIGN PATENT DOCUMENTS

FR 2974421 A1 10/2012

OTHER PUBLICATIONS

French Search Report from the French Patent Office in corresponding French Application No. 1871763 dated Sep. 10, 2019.

*Primary Examiner* — Donald H B. Braswell
(74) *Attorney, Agent, or Firm* — ArentFox Schiff LLP

(57) ABSTRACT

Upon each new detection, called pivot detection, by a radar system, the method includes the steps consisting of: grouping together, with the pivot detection, grouped detections, defined as detections that belong to a sweep preceding the sweep of the pivot detection and that have a non-nil probability according to a grouping criterion; filtering the grouped detections so as to keep only detections that are kinematically strictly coherent with the pivot detection, by: initializing a histogram, each dimension of which is a temporal variation of a coordinate measured by the radar system; computing a potential value interval for each coordinate of the pivot detection and each grouped detection; computing a minimum temporal variation and a maximum temporal variation for the or each coordinate from potential value intervals of the pivot detection and each grouped detection; incrementing the set of classes of the histogram whose index along each dimension is located between the computed minimum and maximum temporal variations; and detecting a target once at least one class of the histogram reaches a predefined value.

9 Claims, 6 Drawing Sheets

(51) Int. Cl.
*G01S 13/56* (2006.01)
*G01S 13/72* (2006.01)

(56) References Cited

U.S. PATENT DOCUMENTS

| | | |
|---|---|---|
| 2005/0264438 A1 | 12/2005 | Fullerton et al. |
| 2008/0133812 A1* | 6/2008 | Kaiser .................... G06F 9/542 |
| | | 710/263 |
| 2011/0102248 A1* | 5/2011 | Maeno .................... G01S 13/72 |
| | | 342/179 |
| 2014/0043185 A1* | 2/2014 | Quellec ................ G01S 13/426 |
| | | 342/146 |
| 2014/0361919 A1 | 12/2014 | Pomerance et al. |
| 2017/0242095 A1* | 8/2017 | Schuh .................. G05D 1/0293 |

* cited by examiner

METHOD AND SYSTEM FOR DETECTION BY LONG INTEGRATION OF KINETICALLY GROUPED RECURRING SAMPLES

CROSS REFERENCED TO RELATED APPLICATIONS

This application claims priority to French Patent Application No. 1871763, filed Nov. 23, 2018. The disclosure of the priority application is incorporated in its entirety herein by reference.

The present invention relates to a method for detecting targets, by using several successive sweeps of a same space and using a kinematic model of the movement of said targets. More specifically, the invention relates to a mobile radar system, naval or airborne, for detecting maritime targets, in particular small targets, that is to say, targets having a small Radar Cross-Section (RCS).

Due to sea clutter, the detection of small targets remains difficult.

Indeed, as shown in FIG. 1, the radar system establishes a set of detections from echoes received from the observed space. A detection is characterized by the crossing of a predefined detection threshold, either manually by the operator, or by an automated device for adaptive positioning of the value of this threshold.

However, when the level of the signal reflected by a target (indicated by a circle in FIG. 1) is low relative to the level of the many pulses of the sea clutter (indicated by a cross in FIG. 1), if the detection threshold is placed at a high value, for example S1 in FIG. 1, to avoid considering stray pulses to be detections, then a small target will not be detected. Conversely, if the detection threshold is placed at a low value (S2 in FIG. 1), then the detections associated with targets are embedded among the large number of detections associated with stray pulses. The formed detections therefore correspond either only to the targets having a high RCS, or to all of the targets and to many false alarms related to pulses from sea clutter.

Techniques have been developed to try to overcome this difficulty, in particular so-called long integration techniques, which make it possible to position the detection threshold much lower (and therefore to increase the detection probability of low RCS targets) while retaining an unchanged false alarm rate (FAR).

To that end, the long integration technique uses several successive sweeps of a same space, while looking for the detections which, among the set of formed detections, are compatible with a kinematic movement model of a target. If this processing makes it possible to identify a sufficient group of detections that are coherent relative to one another, a target is detected. This processing eliminates a large number of false alarms, since they are kinematically incoherent.

Document FR 2,974,421 thus describes a kinematic filtering that makes it possible, after having replaced the detections of the different successive sweeps in a common coordinate system, to perform filtering of the formed detections by basing oneself on a kinematic model of the movement of a target, as opposed to the sea clutter. The kinematic model used is a uniform straight movement, the distance from a target to the radar having to present a linear progression during the successive sweeps of the antenna.

This method for verifying the kinematic coherence of the state of the art, although effective, has the following drawbacks:

The kinematic verification is based on a single coordinate, the distance coordinate. From this point of view, the kinematic coherence is not strictly verified, since at least two parameters are needed to describe a planar trajectory.

The method comprises several steps each involving specific tests and metrics. This results in a loss of computing efficiency and a configuration that is complex and difficult to adapt to various usage scenarios.

The computing complexity of the method is quadratic.

The method is adapted to slow targets, the speed of which along the distance coordinate is typically less than 10 m/s.

The method is specific to rotary radar antennas.

The aim of this invention is to resolve these problems.

To that end, the invention relates to a method for detection by long integration implemented by a radar system for detecting targets, the radar system being able to deliver measurements along at least one coordinate, said method using, as input, a plurality of detections resulting from a plurality of N successive sweeps of a same space by the radar system, and identifying, among said plurality of detections, the detections associated with a same target by applying a kinematic filtering criterion based on a kinematic movement model according to which the targets have a uniform rectilinear movement, characterized in that said method is implemented upon each new detection, called pivot detection, and includes the steps consisting of: grouping together, with the pivot detection, a plurality of grouped detections among the plurality of detections, a grouped detection being a detection that belongs to one of the N−1 sweeps preceding the sweep N of the pivot detection and which has a non-nil likelihood according to a grouping criterion associating the pivot detection and the considered detection; kinematically filtering the grouped detections in order to associate the grouped detections that are strictly kinematically coherent with the pivot detection, by: Initializing a histogram, each dimension of the histogram being a temporal variation of a corresponding coordinate measured by the radar system; Calculating an interval of potential values for the or each coordinate of the pivot detection; then, for each grouped detection, by: Calculating an interval of potential values for the or each coordinate of the considered grouped detections; Calculating a minimal temporal variation and a maximal temporal variation from intervals of potential values of the pivot detection and the considered grouped detection for the or each coordinate measured by radar systems; Incrementing the set of classes of the histogram whose index along each dimension is located between the calculated minimal and maximal temporal variations; and, Testing a kinematic coherence criterion according to which a target is detected once at least one class of the histogram reaches a predefined value.

According to specific embodiments, the method includes one or more of the following features, considered alone or according to any technically possible combinations:

when said at least one coordinate that the radar system measures includes a position, the corresponding temporal variation is a slope; and when said at least one coordinate that the radar system measures includes a speed, the corresponding temporal variation is a speed.

when said position is an azimuth position, the temporal variation is an azimuth; and, when said position is a distance position, the temporal variation is a distance slope.

the grouping criterion associating the pivot detection and the considered detection is the distance between the pivot detection and the considered detection, the detections whose distance is smaller than a reference distance being grouped together with the pivot detection.

the target is a small target.

The invention also relates to a radar system including an analysis stage capable of implementing the preceding method for detection by long integration.

According to specific embodiments, the radar system has one or more of the following features, considered alone or according to any technically possible combinations:

the radar system includes a rotary radar or electron scanning antenna.

the radar system is suitable for being embedded on a platform, the radar system being mobile.

the radar system is dedicated to maritime surveillance.

The invention and its advantages will be better understood upon reading the following detailed description of one particular embodiment, provided solely as a non-limiting example, this description being done in reference to the appended drawings, in which.

IMPLEMENTATION CONTEXT

Figure 1:
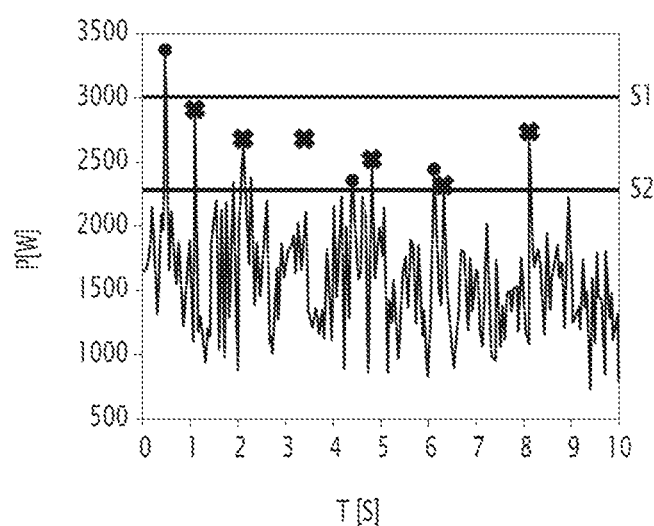
FIG. 1 is a graph of the received power as a function of time.
Figure 2:
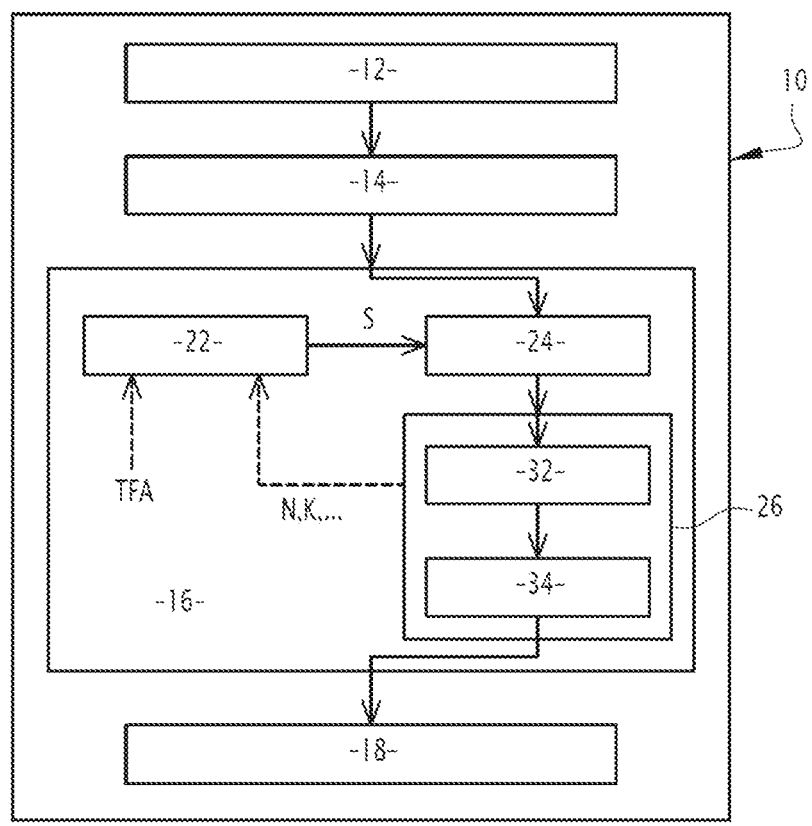
FIG. 2 is an illustration of a preferred embodiment of a radar system implementing the method for detection by long integration according to the invention.

FIG. 2 shows a possible embodiment of a radar system implementing the detection method according to the invention.

The radar system 10, preferably airborne, serves to analyze a maritime area in order to detect targets therein moving on the surface of the water, in particular "small" targets, defined as objects having a low reflexivity, or reduced RCS.

The radar system 10 includes a radar antenna 12. It may involve a rotary antenna with mechanical scanning. It may also involve an electron scanning antenna. In the latter case, the successive scanning moments to be considered may be spaced apart regularly or irregularly over time. The radar antenna 12 delivers, from echoes received from the illuminated reflectors, an electrical signal.

The radar system 10 includes a first processing stage 14, which is associated with the radar antenna 12 and makes it possible to produce a distance sampling from the signal at the output of the antenna. The sampling is made up of a plurality of samples.

The radar system 10 includes a second analysis stage 16, which is capable of analyzing the sampling at the output of the first stage 14, in order to extract any targets therefrom in the form of "plots".

The radar system 10 includes a third tracking stage 18, which uses each plot produced at the output of the second stage 16 to perform tracking of the corresponding target.

The blocks of the analysis chain 16 are as follows:

a block 22 for calculating a detection threshold: the detection threshold S depends on characteristics of the method for detection by long integration implemented in the block 26 (in particular the parameter N of the number of successive sweeps taken into account, the parameter K of the number of kinematically coherent detections in order to constitute a plot, the kinematic model implemented, etc.), as well as the false alarm rate—FAR—expected at the output of the second analysis stage 16. The value of the detection threshold embodies the gain obtained owing to the implemented method for detection by long integration.

a block 24 for processing of the signal: this block implements a typical processing, the role of which is to form detections from the plurality of samples. This processing includes the following generic steps: building an event by post-integration of samples of consecutive recurrences that may or may not coherent; application of the detection threshold to the amplitude of the different constructed events; and creation of a detection when this amplitude is above the applied detection threshold.

a long integration block 26: this block includes a grouping module 32 and a kinematic filtering module 34.

The grouping module 32, which does not fall within the perimeter of the present invention, performs an initial sorting of the detections in order to reduce the computing load done by the module 34. For example, following the creation by the block 24 of a new detection, the grouping module 32 performs the following tasks:

The newly created detection, hereinafter referred to as "pivot detection", is positioned in a common coordinate system. The common coordinate system is a grouping coordinate system shared by the last N sweeps. The center of this grouping coordinate system evolves during the flight of the aircraft to stay fairly close to the average position of the radar antenna at the time of the considered N sweeps.

The detections of the preceding N−1 sweeps, that is to say, which precede the sweep N to which the pivot detection belongs, which are all positioned in the common coordinate system, are sorted according to their positions relative to the position of the pivot detection. Only the detections that have a non-nil probability of being compatible with the pivot detection are then grouped in a detection group. To evaluate this probability, a grouping criterion is used that is quick to compute, for example the distance between the detection belonging to a preceding sweep and the pivot detection and by grouping the detections whose distance is shorter than a reference distance.

Each grouped detection det_i (i being an integer between 1 and Q, which is the number of detections of the group of detections that is associated with the pivot detection piv) is at this stage characterized by:

AZ_det_i, D_det_i: polar, azimuth and distance coordinates in the common coordinate system of the detection det_i; and T_det_i: Date of the acquisition of the detection det_i.

The pivot detection is in turn characterized by:

AZ_piv, D_piv: polar, azimuth and distance coordinates, in the grouping coordinate system of the pivot detection; and T_piv: Acquisition date of the pivot detection.

At the output of the grouping module 32, the detections det_i of the group of detections associated with the pivot detection, and said pivot detection piv are sent to the kinematic filtering module 34.

The kinematic filtering module 34 implements the detection method according to the invention, which will now be described in detail.

General Principle of the Detection Method

In the present embodiment, the kinematic filtering module bases itself on the polar coordinates of the detections (that is to say, the azimuth and distance coordinates of a detection) in the common grouping coordinate system.

The kinematic filtering is done based on a movement model, which is preferably a simple model, for example a rectilinear and uniform movement model, called RUM model hereinafter.

Figure 3:
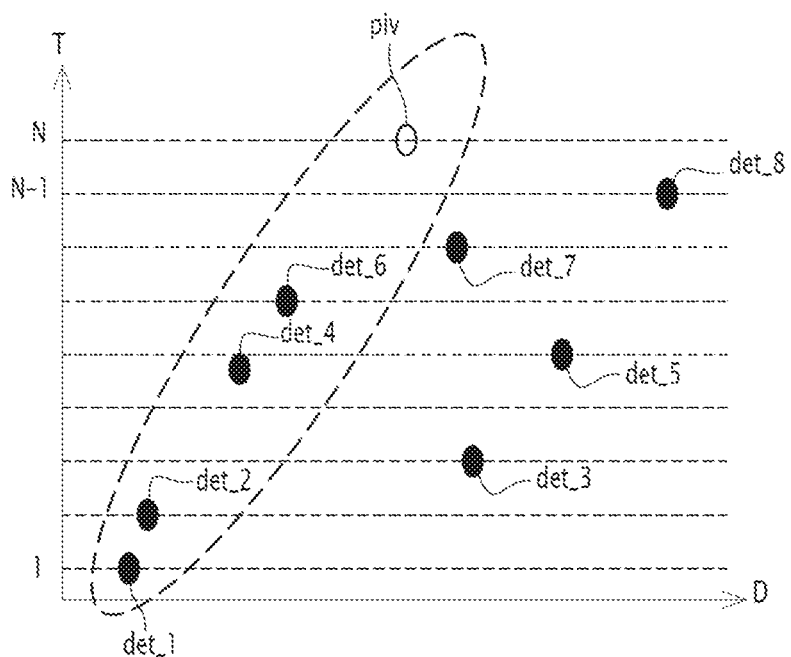
FIG. 3 is a graph showing the detections formed during N successive sweeps as a function of their distance coordinate.

The graph of FIG. 3 shows the detections det_i formed during N−1 successive sweeps as a function of their distance coordinate D and grouped with the pivot detection piv of the last sweep N. The group of detections associated with the pivot detection includes eight detections (Q=8).

In light of the RUM model used, a detection det_i will be considered to be coherent with the pivot detection piv when its polar coordinates evolve linearly with time (to within any measurement uncertainty). This is reflected by the following relationships:

$$D\_det\_i = D\_piv + PD^*(T\_det\_i - T\_piv) + \Delta AZ \quad \text{[Math 1]}$$

$$AZ\_det\_i = AZ\_piv + PAZ^*(T\_det\_i - T\_piv) + \Delta D \quad \text{[Math 2]}$$

With: PD the leading coefficient or slope for the distance coordinate and PAZ the leading coefficient or slope for the azimuth coordinate AZ; and $\Delta Az$ and $\Delta D$ random variables related to the measuring uncertainties on the azimuth and distance coordinates, respectively, of the pivot and grouped detections. Other conventions, in particular of sign and/or unit, can be considered to define the slope.

This search for linearity is done by using the slopes between each grouped detection det_i and the pivot detection piv, and identifying those that are identical (to within any measuring uncertainties). The slopes are thus given by the following relationships:

$$PAZ\_i = (AZ\_det\_i - AZ\_piv)/(T\_det\_i - T\_piv) \quad \text{[Math 3]}$$

$$PD\_i = (D\_det\_i - D\_piv)/(T\_det\_i - T\_piv) \quad \text{[Math 4]}$$

According to the detection method, in the case where K detections are coherent relative to one another (including the pivot detection, that is to say, K−1 detections det_i and the pivot detection piv), a plot is created, then sent to the tracking stage. This is shown in FIG. 3 by the ellipse associating the detections det_1, det_2, det_4, det_6 and piv, K then being equal to 5 so that a plot is created.

Figure 4:
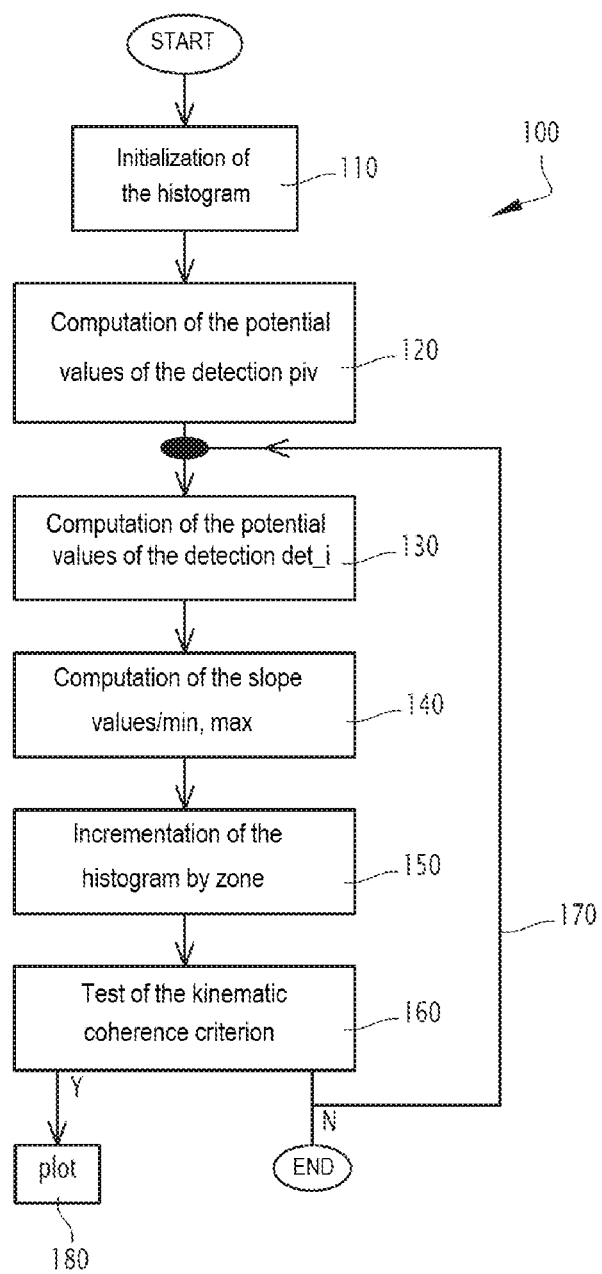
FIG. 4 is a schematic block illustration of one preferred embodiment of the method for detection by long integration according to the invention.

The method for detection by long integration 100 according to the invention is based on the use of a histogram of potential values H. As shown in FIG. 4, it comprises the following steps:

In step 110, a histogram H with two dimensions is initialized. This histogram will be used to position each detection det_i according to an azimuth slope value PAZ_i and a distance slope value PD_i. The characteristics of the histogram are as follows (the numerical values that correspond to a preferred implementation are given as an example):

Nb_PAZ: number of azimuth slope classes (for example 100);

Nb_PD: number of distance slope classes (for example 100);

PAZ_min: minimum value of the azimuth slope (for example −1°/s);

PAZ_max: maximum value of the azimuth slope (for example 1°/s);

PD_min: minimum value of the distance slope (for example −25 m/s); and

PD_max: maximum value of the distance slope (for example 25 m/s).

All of the classes of this histogram are initialized at the nil value.

In step 120, an interval of potential azimuth values and an interval of potential distance values of the pivot detection are calculated.

In this step, one seeks to determine, from azimuth and distance measurements obtained with a certain uncertainty for the pivot detection, the intervals in which the true values of these two properties are contained with a given confidence level. These intervals are called potential value intervals. They assume the following form:

Interval of potential azimuth values: [AZ_piv_min; AZ_piv_max] with AZ_piv_min=AZ_piv−Tol_AZ and AZ_piv_max=AZ_piv+Tol_AZ, where AZ_piv is the measured azimuth of the pivot detection in the common coordinate system and Tol_AZ is the azimuth allowance taking account of the measuring uncertainty;

Interval of potential distance values: [D_piv_min; D_piv_max] with D_piv_min=D_piv−Tol_D and D_piv_max=D_piv+Tol_D, where D_piv is the measured distance of the pivot detection in the common coordinate system and Tol_D is the distance allowance taking account of the measuring uncertainty.

In step 130, an interval of potential azimuth values and an interval of potential distance values are calculated for each grouped detection det_i of the group associated with the pivot detection.

As above for the pivot detection, for the grouped detection det_i, the possible value intervals assume the following form:

Interval of potential azimuth values: [AZ_det_i_min; AZ_det_i_max] with AZ_det_i_min=AZ_det_i−Tol_AZ and AZ_det_i_max=AZ_det_i+Tol_AZ, where AZ_1 is the measured azimuth of the detection det_i in the grouping coordinate system and Tol_AZ is the azimuth allowance;

Interval of potential distance values: [D_det_i_min; D_det_i_max] with D_det_i_min=D_det_i−Tol_D and D_det_i_max=D_det_i+Tol_D, where D_det_i is the measured distance of the detection det_i in the common coordinate system and Tol_D is the distance allowance.

There are several approaches to compute the allowances, for example by setting arbitrary allowance values or by computing them so they best correspond to the measurements. The effect on the allowance of the grouping of the different detections in the common coordinate system can also be taken into account.

Likewise, it is possible to adjust the allowances so as to adjust the kinematic rigidity of the processing. The greater the allowances are, the more the processing will be able to detect targets whose movement deviates from the rectilinear uniform movement of the kinematic model used.

An example computation of the allowances is given below.

The uncertainties of the measurements come from the measuring uncertainty inherent to the radar, hypothetically Gaussian, usually characterized by the standard deviations respectively in azimuth St_AZ and in distance St D.

In the present embodiment, it is chosen to define the intervals with a confidence level of 95%. In light of the Gaussian model, this corresponds to allowances on the radar measurement of:

$$Tol\_AZ = 2 \times St\_AZ \qquad \text{[Math 5]}$$

$$Tol\_D = 2 \times St\_D \qquad \text{[Math 6]}$$

Figure 5:
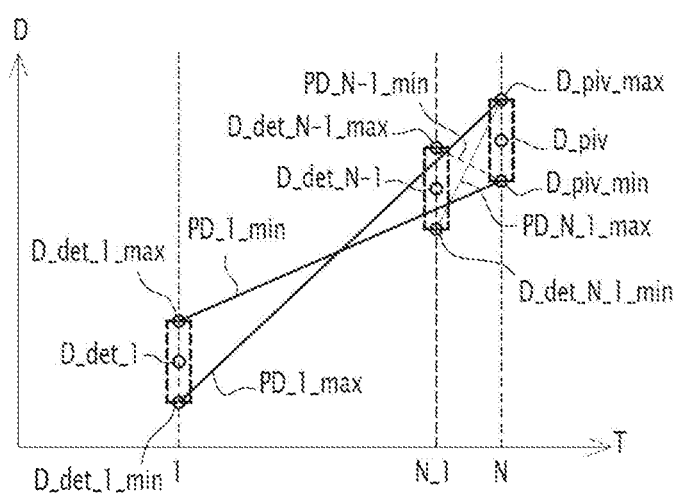
FIG. 5 is a graph illustrating the concept of possible value intervals for the distance coordinates and that of maximum and minimum slope, concepts used in the method of FIG. 4.

FIG. 5 illustrates steps 120 and 130 for determining, for the distance coordinate, a possible value interval for the pivot detection, the detection det_1 and the detection det_N-1.

In step 140, slope values are calculated. To that end, from potential value intervals, the minimum and maximum slopes are calculated for each pivot detection/grouped detection pair. FIG. 5 illustrates step 140 for the distance coordinate.

Thus, for a pair associating the pivot detection and the grouped detection det_i, four extreme slope values are determined:

$$PAZ\_ii\_min = (AZ\_det\_i\_max - AZ\_piv\_min))/(T\_det\_i - T\_piv) \qquad \text{[Math 7]}$$

$$PAZ\_i\_max = (AZ\_det\_i\_min - AZ\_piv\_max)/(T\_det\_i - T\_piv) \qquad \text{[Math 8]}$$

$$PD\_i\_min = (D\_det\_i\_max - D\_piv\_min)/(T\_det\_i - T\_piv) \qquad \text{[Math 9]}$$

$$PD\_i\_max = (D\_det\_i\_min - D\_piv\_max)/(T\_det\_i - T\_piv) \qquad \text{[Math 10]}$$

In step 150, the histogram H is incremented by class zone. More specifically, the minimum and maximum azimuth and distance indexes are computed, respectively, of the classes of the histogram, which correspond to the four extreme values of the slopes determined in step 140:

$$clAZ\_i\_min = E(Nb\_PAZ \times (PAZ\_i\_min - PAZ\_min))/(PAZ\_max - PAZ\_min)) \qquad \text{[Math 11]}$$

$$clAZ\_i\_max = E(Nb\_PAZ \times (PAZ\_i\_max - PAZ\_min))/(PAZ\_max - PAZ\_min)) \qquad \text{[Math 12]}$$

$$clD\_i\_min = E(Nb\_PD \times (PD\_i\_min - PD\_min))/(PD\_max - PD\_min)) \qquad \text{[Math 13]}$$

$$clD\_i\_max = E(Nb\_PD \times (PD\_i\_max - PD\_min))/(PD\_max - PD\_min)) \qquad \text{[Math 14]}$$

where the function E( ) corresponds to the "whole part" function.

The azimuth index clAZ and the distance index clD are limited to be between zero and NB_PD−1 (respectively zero and NB_PAZ−1).

All of the classes whose azimuth index and distance index are between the minimum and maximum indices are "possible", since they correspond to potential positions of the target. As a result, step 150 consists of incrementing all of the classes (clAZ, clD) of the histogram verifying:

$$clAZ\_i\_min \leq clAZ \leq clAZ\_i\_max \text{ and } clD\_i\_min \leq clD \leq clD\_i\_max, \qquad \text{[Math 15]}$$

that is to say, the classes of a zone (zone_i in FIG. 6) delimited by the indices clAZ_i_min and clAZ_i_max [in] azimuth clD_i_min and clD_i_max in distance.

Figure 6:
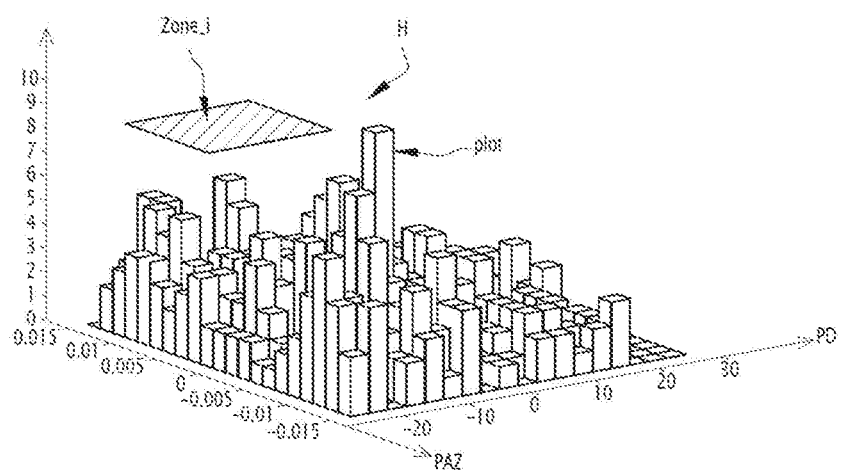
FIG. 6 is a histogram along the azimuth slope and distance slope dimensions used in the method of FIG. 4.

This incrementation by zone is illustrated in FIG. 6.

In step 160, a kinematic coherence criterion is tested. This criterion is preferably as follows: if a class of the histogram contains K−1 elements, then a plot is formed in step 180. This indeed means that K−1 detections are potentially aligned with the pivot detection, and therefore that K detections are kinetically coherent.

In step 170, if the coherence criterion is not verified, the method 100 loops back to step 130 to take the following detection det_i into account in the group of detections associated with the pivot detection. If all of the detections of the group have been processed without a plot having been created, the method ends.

The method according to the invention that implements an incrementation by zone has the following advantages:
- the kinematic coherence is strictly verified, since all of the incremented classes correspond to the potentially true values of the position of the reflector.
- the method naturally takes account of the statistical distribution of the slope values according to the date of the grouped detection (the temporally closer the detection is to the pivot detection, the greater the uncertainty is on the value of the slope).

The method has a linear computational complexity, which allows a faster execution than the known alternatives.

Variants

This detection method can be implemented by characterizing the detections differently than by their polar coordinates, for example by their Cartesian coordinates.

This detection method can be implemented by characterizing the detections using a single coordinate, for example distance. In this case, the computation steps are the same as those previously described, but limited solely to the distance coordinate. The histogram of the potential values is then a histogram with one dimension, namely the distance slope. The advantage of this implementation is a very high speed of execution.

This detection method can be implemented by characterizing each detection using one or several speed coordinates, for example the radial speed of the reflector when the radar used is operating in Doppler mode. Preferably, each detection is also characterized using one or several position coordinates, for example in azimuth and distance. The search for kinematic coherence is then done on a three-dimensional histogram (one radial speed coordinate and two position coordinates). The computation of the classes to be incremented for the azimuth slope coordinate (which is similar to azimuth speed) and distance slope coordinate (which is similar to a separation speed) is identical to that previously described. For the radial speed, the classes must be directly connected to the parameter and not to the slope of this parameter, since the radial speed is already a speed. Steps similar to that which was described above are implemented:

Initializing the histogram according to the radial speed dimension:
NB_VR: number of radial speed classes. For example 100
VR_MIN and VR_MAX: radial speeds corresponding to the extreme classes. For example −25 and 25 m/s.

Computation of the potential speed values: [VR_det_i−Tol_VR; V_det_i+Tol_V]
where VR_det_i is the radial speed measured for the detection det_i and tol_VR is the allowance on the radial speed. The value of the allowance is to be determined based on the implementation choices. For example, Tol_VR=4×St VR where St VR is a measurement uncertainty on the radial speed.

Maximum and minimum indices of the classes:

$$clVR\_i\_min = E(NB\_VR \times (VR\_det\_i - Tol\_VR - VR\_MIN)/(VR\_MAX - VR\_MIN)) \qquad \text{[Math 16]}$$

$$clVR\_i\_max = E(NB\_VR \times (VR\_det\_i + Tol\_VR - VR\_MIN)/(VR\_MAX - VR\_MIN)) \qquad \text{[Math 17]}$$

The classes of the zone zone_i of the histogram 3D whose indices (clAZ, cID, clVR) verify the following constraints are incremented by one unit:

$$clAZ\_i\_min \leq clAZ \leq clAZ\_i\_max \quad \text{[Math 18]}$$

and $$clD\_i\_min \leq clD \leq clD\_i\_max$$

and $$clVR\_i\_min \leq clVR \leq clAR\_i\_max$$

The integers N and K are adjustable parameters as a function of the operational situation, in particular, the sea condition.

The invention claimed is:

1. A long integration detection method implemented by a radar system for detecting targets, the radar system delivering measurements along at least one coordinate, said method using, as input, a plurality of detections, the detections of the plurality of detections resulting from a plurality of N successive sweeps of a same space by the radar system, and being associated with a same target by applying a kinematic filtering criterion based on a kinematic movement model according to which targets have a uniform rectilinear movement, wherein said method is implemented for each detection of the plurality of detections that results from the $N^{th}$ sweep, said detection being called a pivot detection, and includes the steps consisting of:

grouping with the pivot detection, a plurality of grouped detections, each grouped detection of the plurality of grouped detections being a detection of the plurality of detections that results from the $N-1^{th}$ sweeps preceding the $N^{th}$ sweep of the pivot detection and has a non-nil likelihood according to a grouping criterion associating the pivot detection and said detection;

kinematically filtering the plurality of grouped detections in order to keep the grouped detections of the plurality of grouped detections that are strictly kinematically coherent with the pivot detection, by:

Initializing a histogram, each dimension of the histogram being a temporal variation of a corresponding coordinate measured by the radar system;

Calculating an interval of potential values for each coordinate of the pivot detection; then, for each grouped detection of the plurality of grouped detections:

Calculating an interval of potential values for each coordinate of said grouped detection;

Calculating a minimal temporal variation and a maximal temporal variation from the intervals of potential values of the pivot detection and said grouped detection for each coordinate measured by the radar system;

Incrementing each class of the histogram whose index along each dimension is located between the minimal and maximal temporal variations calculated; and Testing a kinematic coherence criterion according to which a target is detected once at least one class of the histogram reaches a predefined value.

2. The method according to claim 1, wherein, when the at least one coordinate that the radar system measures includes a position, the corresponding temporal variation is a slope; and when the at least one coordinate that the radar system measures includes a speed, the corresponding temporal variation is a speed.

3. The method according to claim 2, wherein, when the position is an azimuth position, the temporal variation is an azimuth slope; and, when the position is a distance position, the temporal variation is a distance slope.

4. The method according to claim 1, wherein the grouping criterion associating the pivot detection and said detection of the plurality of detections is a distance between the pivot detection and said detection, the detections whose distance is smaller than a reference distance being grouped together with the pivot detection.

5. The method according to claim 1, wherein the target is a small target.

6. A radar system including an analysis stage suitable for implementing a long integration detection method according to claim 1.

7. The radar system according to claim 6, including a mechanically-scanned antenna or electronically-scanned antenna.

8. The radar system according to claim 6, embedded on a platform, the radar system being mobile.

9. The radar system according to claim 6, dedicated to maritime surveillance.

* * * * *